United States Patent [19]

Bennefeld

[11] 4,131,841

[45] Dec. 26, 1978

[54] BATTERY CHARGER WITH AUTOMATIC CHANGE FROM CURRENT TO VOLTAGE MODE CONTROL

[75] Inventor: David H. Bennefeld, Anoka, Minn.

[73] Assignee: Introl Corp., Minneapolis, Minn.

[21] Appl. No.: 715,718

[22] Filed: Aug. 19, 1976

Related U.S. Application Data

[63] Continuation-in-part of Ser. No. 577,175, May 14, 1975, Pat. No. 4,019,111.

[51] Int. Cl.² .............................................. H02J 7/04
[52] U.S. Cl. .................................. 320/23; 320/32; 320/39
[58] Field of Search ...................... 320/21, 22, 23, 24, 320/32, 39, 40

[56] References Cited

U.S. PATENT DOCUMENTS

| | | | |
|---|---|---|---|
| 3,086,159 | 4/1963 | Daly | 320/39 |
| 3,376,487 | 4/1968 | Bixby | 320/32 |
| 3,736,490 | 5/1973 | Fallon et al. | 320/39 |
| 3,854,082 | 12/1974 | Nasby et al. | 320/39 X |

Primary Examiner—Robert J. Hickey
Attorney, Agent, or Firm—Merchant, Gould, Smith, Edell, Welter & Schmidt

[57] ABSTRACT

An improved battery charger having a current limiting transformer for supplying a charging current. The transformer includes primary and secondary coils wound about a core and has a shunt path for a portion of the magnetic flux induced by the voltage appearing on the primary. A pair of silicon controlled rectifiers are alternately triggered into their forward conductive states at points relatively early in each alternating current half cycle to provide a maximum charging current when a substantially discharged battery is to be recharged. As the charging process progresses, the battery voltage increases and at a predetermined value of the battery voltage a smooth transition from the current-controlled mode to a voltage-controlled mode is inaugurated. After the change to the voltage-controlled mode has been completed, the SCRs are triggered into conduction much later in each cycle, thereby furnishing a very low or trickle current which can be continued indefinitely without damage to the battery. Simple adjustments are provided for determining the maximum current charging rate and the particular voltage at which the changeover is to begin. Provision is also made for preventing an initial sudden current surge when first turning on the power, thereby avoiding any unnecessary blowing of fuses.

7 Claims, 9 Drawing Figures

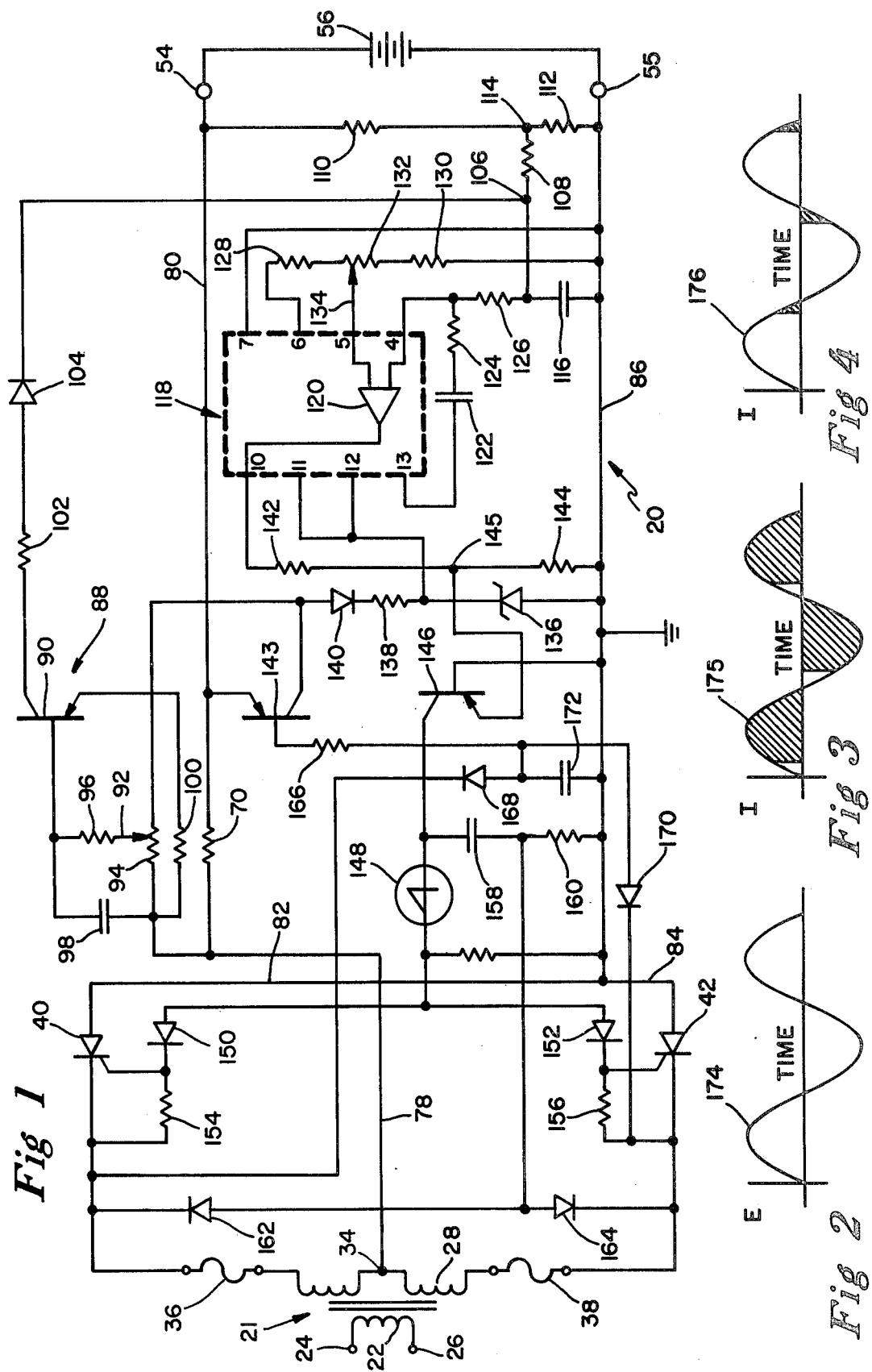

BATTERY CHARGER WITH AUTOMATIC CHANGE FROM CURRENT TO VOLTAGE MODE CONTROL

BACKGROUND OF THE INVENTION

This application is a continuation-in-part of U.S. application Ser. No. 577,175, filed May 14, 1975 now Patent No. 4,019,111, issued Apr. 19, 1977.

FIELD OF THE INVENTION

This invention relates generally to battery chargers, and pertains more particularly to a charger which automatically reduces the charging current when a predetermined battery voltage is reached and has a current limiting transformer for supplying the charging current.

DESCRIPTION OF THE PRIOR ART

The prior art is replete with various types of battery chargers. Some operate on only a time basis, switching from a rapid charge to a trickle charge after a predetermined period of time has elapsed. Still others provide an uncontrolled maximum charging current initially without any attempt to control the magnitude of the current during the rapid charging period; when a predetermined battery voltage is reached, then there is a sudden reduction to the trickle charge. Various hardware techniques have been resorted to in the past in an effort to provide a fast charge, yet not damage the battery. However, the prior art arrangements with which I am acquainted all have certain shortcomings which the present invention effectively overcomes.

SUMMARY OF THE INVENTION

The present invention is a battery charger having in combination a current limiting transformer for supplying charging current and means regulating the charging current to provide a relatively high charging current rate while the battery voltage is below a threshold voltage and a relatively low charging current rate when the battery voltage reaches the threshold voltage.

In one embodiment of the present invention the current limiting transformer has a degree of magnetic decoupling between the primary and secondary coils, the decoupling achieved by a magnetic flux shunt path.

In another embodiment, my invention contemplates the use of a current limiting transformer in combination with the controlled triggering of silicon controlled rectifiers so as to provide first a relatively constant charging current for whatever period is needed and later to reduce the current to a minimal or trickle value after the battery voltage has reached a predetermined level. A current sensing circuit provides a voltage signal in accordance with the amount of charging current and exercises a dominant control during the high charging rate interval. The terminal voltage of the battery undergoing charge is continually sensed but remains ineffectual, or substantially so, until the desired battery voltage is reached. By means of a summing point, the resulting algebraic sum of the two voltages derived from the current and voltage sensing is applied to one input of an error amplifier. The other input to the error amplifier has a reference voltage impressed thereon which is set so that when the battery voltage reaches a predetermined level, a changeover from the current-controlled mode of operation to a voltage-controlled mode will be initiated. When there is a difference between the voltages supplied to the error amplifier, then there is an output voltage or error signal that is representative of the difference between the two input voltages to the error amplifier. The output voltage or error signal causes a transistor to conduct in accordance with the magnitude of such output or error signal. Responsive to the state of conduction of the transistor is a timing capacitor which activates a triggering device which in turn triggers the two silicon controlled rectifiers into conduction, doing so at particular points in the various alternating current cycles. The successive triggering of each SCR during the early portion of a cycle causes a greater flow of current and a triggering late in the cycle produces a much lower charging current.

When the power is first turned on, a transistor functioning as a switch prevents the above-mentioned transistor from becoming conductive so that no triggering action immediately occurs; however, as the above-mentioned transistor becomes conductive, the triggering device turns on the SCRs, first late in the cycle and then progressively earlier in succeeding cycles until the required amount of maximum charging current is reached. This is quite rapidly (within a few cycles) but not instantaneously, thereby preventing the blowing of fuses unnecessarily.

BRIEF DESCRIPTION OF THE DRAWINGS

FIG. 1 is a schematic diagram exemplifying my battery charger;

FIG. 2 represents a typical AC voltage waveform to the charger;

FIG. 3 depicts a typical current waveform (before rectification), the shaded portions representing the portions during which the rectifiers are conducting to provide the high charging current rate;

FIG. 4 corresponds to FIG. 3, the small shaded portions illustrating the brief conductive periods producing the trickle portion of the charging procedure;

DESCRIPTION OF THE PREFERRED EMBODIMENT

Figure 6:
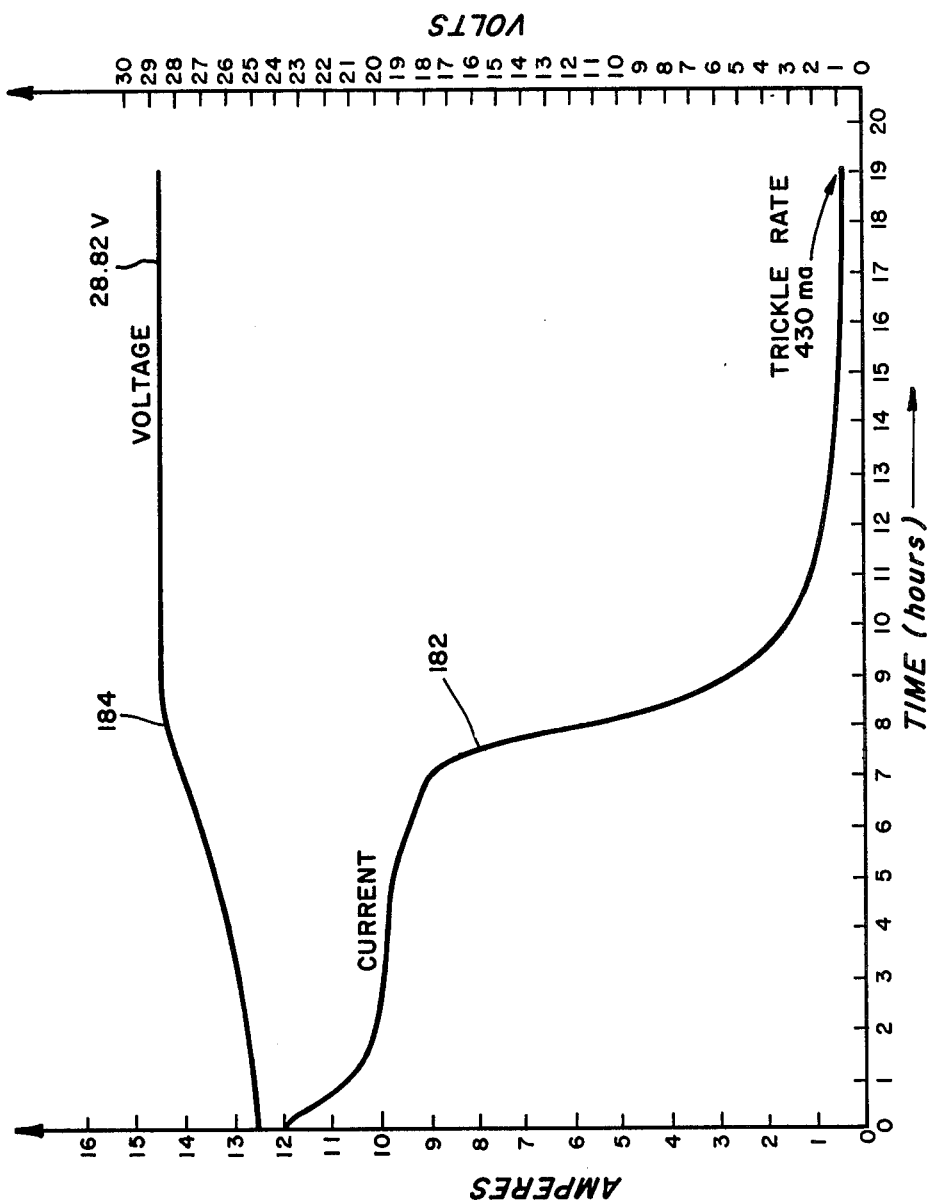
FIG. 6 is a composite graph showing the relation between the battery charging current and the battery voltage when employing my charger, typical current values being given at the left and typical voltage values being given at the right.

Referring to FIG. 1, my battery charger has been denoted generally by the numeral 20. Included is a power supply constituting a transformer 21 having a primary winding 22 provided with terminals 24 and 26 which connect to a conventional 50 or 60 Hz AC power source. The transformer 21 is of conventional construction and not frequency dependent as are ferroresonant transformers which are employed in many prior art chargers. While nominally 115 volts, the voltage can vary over a range from 95–135 volts, it may be pointed out.

Figure 7:
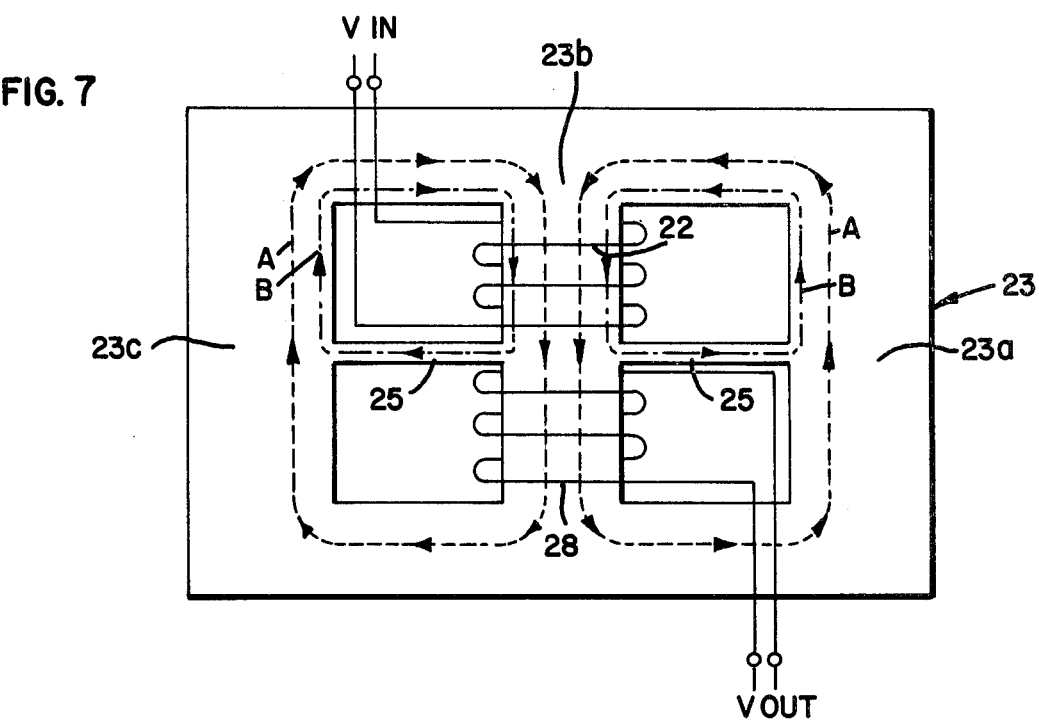
FIG. 7 is a schematic representation of one embodiment of the current limiting transformer utilized in the present invention.

The transformer utilized in the preferred embodiment of the present invention is illustrated schematically in FIG. 7. Primary coil 22 and secondary coil 28 are wound on a core 23 having members 23a, 23b and 23c which define the magnetic flux paths of the transformer. Shunt members 25, typically formed of the same magnetic material as core 23, provide an alternate flux path for a portion of the magnetic flux induced by primary coil 22. The main magnetic flux path associated with the primary coil 22 is shown in the drawing at A. The magnetic flux shunt path is illustrated at B. Although in the embodiment shown in FIG. 7, the shunt members 25 provide an uninterrupted magnetic material shunt path, it is contemplated that an air gap could be provided in shunt members 25 to alter the transformer characteristics.

Figure 8:
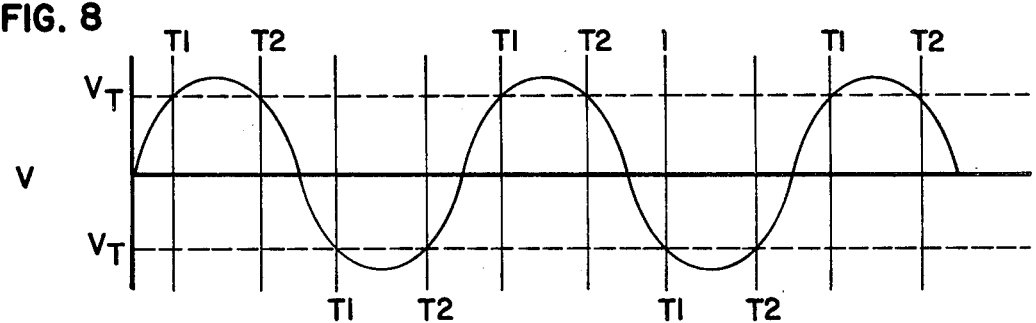
FIG. 8 is a waveform of the voltage applied to the battery charger.

The effect of the magnetic decoupling between primary coil 22 and secondary coil 28 will be described with reference to the waveforms illustrated in FIG. 8 and FIG. 9. FIG. 8 illustrates the AC input voltage to the battery charger appearing on primary coil 22. A threshold voltage $V_T$ is shown on both the positive and negative half cycles of the input voltage. Generally, current will not flow to the battery unless the voltage input exceeds threshold voltage $V_T$ which may be calculated by multiplying battery voltage times the transformer turns ratio. In a transformer having no magnetic decoupling, therefore, charging current would flow in the time interval T1-T2. The charging current generated utilizing a magnetically decoupled transformer is shown in FIG. 9.

Figure 9:
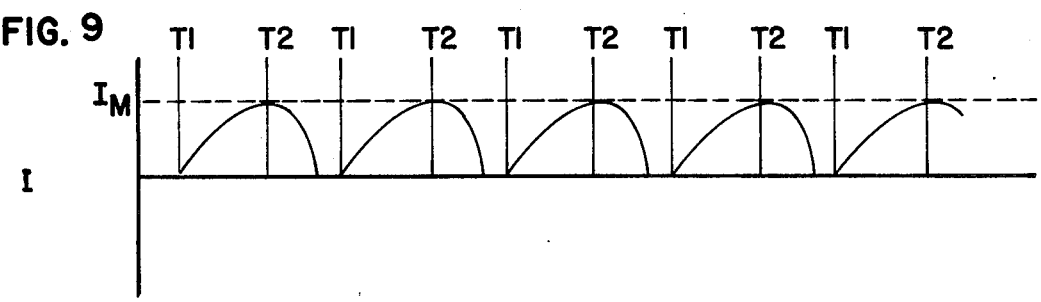
FIG. 9 is a waveform of the rectified charging current showing the maximum current utilizing the current limiting transformer of the present invention.

In FIG. 9, since the charging current is rectified, the current is shown as a rectified positive current signal. Current begins to flow at time T1. Shunt member 25, in effect, adds an inductive component to the impedance of the transformer secondary 28 resulting in an energy storage in the transformer. Thus, at time T2 as the input voltage falls below the threshold voltage $V_T$ the current continues to flow in the secondary coil 28. The current falls to zero at some time prior to the subsequent time T1 when the input voltage again exceeds threshold voltage $V_T$. Depending on the transformer coil, core, and shunt structure the maximum current can be limited to a predetermined value $I_M$. In a transformer having no magnetic decoupling between primary and secondary, current flowing in the interval T1-T2, due to the low impedance of the battery might reach excessive peak values which could result in excessive heat dissipation in the components of the charging circuit, and could tend to destroy some circuit components. The maximum current $I_M$ achieved utilizing a magnetically decoupled transformer is typically one half the current peak that would otherwise be generated while maintaining the average charging current at a value comparable to that which would be achieved utilizing a coupled transformer.

The time T1 is regulated as will be subsequently described to increase charging current applied to a substantially discharged battery and to progressively decrease the charging current as battery voltage increases. Adjustment of time T1 is illustrated by FIG. 3 and FIG. 4. The current waveforms shown in FIG. 3 and FIG. 4 are, for convenience, depicted as sine waves. It will be understood that the actual charging current is shown in FIG. 9. As T1 is adjusted by the circuitry which will be subsequently described, the ratio of peak to average charging current remains constant.

The secondary coil 28 is center tapped at 34. Connected to the ends of the secondary winding 28 are fuses 36 and 38, which, because of a precautionary feature later to be described, need not be of the slow blowing type. Although referred to more specifically hereinafter, two silicon controlled rectifiers 40 and 42 will be merely mentioned at this time; these rectifiers change the AC current supplied by the transformer 21 to DC current which is, of course, essential when charging any battery. My battery charger 20 additionally includes a pair of output terminals 54 and 55 to which the battery 56 is connected during the charging thereof; more specifically, the positive side of the battery 56 is connected to the terminal 54 and its negative side to the terminal 55.

A current sensing resistor 70 is employed, which will hereinafter be more specifically referred to. At this time, it will be mentioned that the ensuing description will be facilitated somewhat by assigning reference numerals to certain conductors (but not all of them) contained in the charger 20. In this regard, a conductor 78 connects the terminal at the center tap 34 to one end of the current sensing resistor 70, an additional conductor 80 extending from the other end of the current sensing resistor 70 to the output or load terminal 54. Still further, conductors 82 and 84 connect the cathodes of the silicon controlled rectifiers 40, 42 to a conductor 86 extending to the output or load terminal 55.

To provide a voltage signal representative of the magnitude of charging current flowing to the battery 56, which must flow through the serially connected current sensing resistor 70, a current sensing circuit 88 is employed. The current sensing circuit 88 includes a PNP transistor 90 having its base connected to the wiper arm 92 of a potentiometer 94, the connection being through a resistor 96. Between the end of the resistor 96 that is attached to the base of the transistor 90 and the end of the potentiometer attached to the current sensing resistor 70 is a capacitor 98. The emitter of the transistor 90 is connected to the same end of the potentiometer 94 as the capacitor 98 is connected, being connected through an emitter resistor 100. The collector of the transistor 90 is connected to one end of a resistor 102, the other end of the resistor 102 being attached to the anode of a diode 104.

The foregoing completes the description of the current sensing circuit 88. However, it will be perceived that the cathode of the diode 104 is connected to a summing point labeled 106. The adjustment or setting of the potentiometer 94, more specifically its wiper arm 92, causes the transistor 90 to become responsive to current flowing through the sensing resistor 70, its conduction causing current to flow through the resistor 102, the diode 104 to the summing point 106.

The summing point 106 is connected through a resistor 108 to a voltage divider composed of a pair of resistors 110, 112. The junction 114 between the resistors 110, 112 provides a voltage that is representative of the battery voltage existing between the terminals 54, 55, this voltage being applied to the summing point 106 through the resistor 108. Thus, the point 106 algebraically sums the voltage forwarded from the current sensing circuit 88, which is representative of the value of charging current, and the voltage supplied by the voltage divider 110, 112, which is representative of the battery voltage as it changes during charging. The resistor 108 and a capacitor 116 perform an averaging function for the resulting potential or voltage at the summing point 106, the capacitor 116 being connected between the summing point 106 and the conductor 86.

At this time, attention is directed to a voltage regulator 118, such as the linear integrated circuit chip, type 723, part 723DM, this being a 14-lead DIP package, manufactured by Fairchild Semiconductor, 464 Ellis Street, Mountain View, Calif. 94040. Whereas the regulator chip 118 is provided with 14 leads, only eight of these leads are actually used. It will help to label the various leads with the same numbers used in the descriptive literature published by Fairchild, the numerals 4–7 and 10–13 appearing within the rectangle denoting the chip regulator 118. It is not believed necessary to set forth herein the equivalent circuit for the regulator 118; however, it will be helpful to depict the error amplifier 120 within the integrated chip that has its two input terminals connected to the leads 4 and 5 and its output terminal connected to the lead 10. Any difference between the voltages applied to the leads 4 and 5 is reflected as an error voltage or difference signal at the output lead 10. Although not essential for an understanding of the present invention, an integrator for the regulator 118 comprises a capacitor 122 and resistors 124, 126. One end of the resistor 126 is connected to the summing point 106 and also to the capacitor 116, whereas the other end of the resistor 126 is connected to the input lead 4 of the regulator 118, thereby applying the algebraically summed voltage at the point 106 to one input of the error amplifier 120. A reference voltage is applied to the other input of the amplifier 120 via lead 5, this being supplied by a voltage divider composed of resistors 120, 130 plus a potentiometer 132 connected between the resistors 128 and 130. The wiper arm 134 of the potentiometer 132 connects directly to the input lead 5 of the regulator 118. In this way, the reference voltage can be varied, and, as will become clear hereinafter, the setting of the wiper arm 134 determines the voltage at which the circuit 44 switches from its current mode to its voltage mode.

It will be seen that the lead 7 of the regulator 118 is connected directly to the conductor 86. The leads 11 and 12 are connected to the cathode of a Zener diode 136, the anode of the Zener diode 136 being connected to the conductor 86. The Zener diode 136 merely limits the voltage that is supplied to the leads 11 and 12 of the regulator 118. It might be mentioned at this stage that the leads 11, 12 are also connected to a resistor 138 that is in circuit with a diode 140, the anode of the diode 140 being connected to the other end of the potentiometer 94 of the current sensing circuit 88 and also to the collector of another transistor 143 which functions as a switching device to prevent initial charging current surging as will hereinafter be explained.

As earlier mentioned, the output lead 10 carries a voltage that is indicative of the difference or error between the voltages applied to the input leads 4, 5. The lead 10 is connected to one end of a voltage divider comprised of resistors 142 and 144. It is the junction 145 between the resistors 142, 144 that is connected to the emitter of a PNP transistor 146 having its base connected to the conductor 86. The collector of the transistor 146 is connected directly to one side of a triggering device 148. The other side of the triggering device 148 is connected to the anodes of a pair of diodes 150 and 152, the cathodes of these diodes being connected to the gates of the previously mentioned silicon controlled rectifiers 40 and 42. Also, the cathodes of the diodes 150 and 152 are connected to one end of resistors 154 and 156, the other ends of the resistors 154 and 156 being connected to the anodes of the SCRs 40 and 42, respectively.

For the purpose of determining the time at which the triggering device 148 conducts, a capacitor 158 is connected between the side of the triggering device 148 which is attached to the collector of the transistor 146 and a resistor 160, the resistor in turn being connected to the conductor 86. The same side or plate of the capacitor 158 that is connected to the resistor 160 is also connected to the anodes of two diodes 162 and 164, the cathodes of these diodes 162 and 164 being attached to the fuses 36 and 38, respectively (and also the cathodes of the SCRs 40, 42).

The transistor 142 that has been previously mentioned has its base attached to one end of a resistor 166, the other end of the resistor 166 being connected to the anodes of diodes 168, 170 and to one side of a capacitor 172. The cathode of the diode 168 is connected to the fuse 36 (and the cathode of the rectifier 40), whereas the other side of the capacitor 172 is attached to the conductor 86.

Operation

Having presented the foregoing, the operation of the charger 20 exemplifying my invention is as follows. When the input terminals 24 and 26 of the primary winding 22 of the transformer 21 are connected to an appropriate AC power source, then the secondary winding 28 is energized so as to cause a voltage, such as that exemplified by the waveform 174 of FIG. 2, to be supplied to the control circuit portion of my charger 20 which is connected to the opposite ends of the secondary winding 28 via the fuses 36, 38 and also to the center tap labeled 34. As the voltage at the center tap 34 increases in a positive direction, there is a flow of current via the conductor 78, through the current sensing resistor 70, thence over the conductor 80 to the output or load terminal 54, then through the positive terminal or side of the battery 56 undergoing charge, from the negative side of the battery 56 through the output terminal 55, then via the conductor 86, which can be considered "ground", to the junction of the conductors 82 and 84. If the end of the secondary winding 28 of the transformer 21 connected to the fuse 36 is negative at the particular moment, then there is a flow of current through the conductor 82 to the anode of the SCR 40.

However, for the current to flow through SCR 40, its gate must have an appropriate triggering voltage applied thereto through the diode 150. This can only be accomplished if the triggering device 148 is conductive. The conduction of the triggering device 148 depends upon the charge on the timing capacitor 158. However, the charge on this capacitor 158 is influenced by the amount transistor 146 conducts. The conductive state of transistor 146 in turn depends upon the output voltage from the lead 10 of the regulator 118. The error amplifier 120 contained in the regulator 118 produces an error voltage depending upon the difference between the voltage applied to the lead 4 and that impressed on the lead 5. It will be understood that the particular voltage appearing at the summing point 106 determines the magnitude of the output signal from the lead 10, being compared with the reference voltage supplied by the potentiometer 132. When the error or difference is reduced to zero, there will be an output from the amplifier 120 via the lead 10 to transistor 146 which causes properly timed trigger pulses to be applied to SCR 40 and SCR 42 which, in turn, cause sufficient current to flow to the battery 56 to maintain a zero error signal at the amplifier 120.

As far as the potential appearing at the summing point 106 is concerned, it is derived from the current sensing circuit 88 during the current mode operation; it is derived from the divider network comprised of the resistors 112, 114 during the subsequent voltage mode operation, however. Regarding the current mode operation, the amount of current flowing through the sensing resistor 70 determines the voltage supplied to the potentiometer 94. The potentiometer 94 is in parallel with the current sensing resistor 70. More specifically, an electrical path can be traced from the center tap 34, the conductor 78, through the potentiometer 94, through the collector and emitter of the transistor 143 to the conductor 80. It will be recognized that the conductor 80 has one end attached to the current sensing resistor 70, thereby completing the parallel path just traced. The transistor 143 is normally saturated, but performs a switching function as will presently be clarified.

At this time, it will be recognized that the magnitude of the voltage drop across the potentiometer 94 influences the bias voltage applied to the base of the transistor 90 through the wiper arm 92 of the potentiometer 94 and through the resistor 96. Also, the capacitor 98 in conjunction with the resistor 96 averages the voltage, and hence an average of the charging current, which voltage is impressed on the base of the transistor 90. Being a PNP transistor, when the bias applied to the base thereof goes sufficiently negative, the transistor 90 becomes conductive so as to cause current to flow through the resistor 102 and the diode 104 to the summing point 106 and thus applies a potential thereto representative of the charging current flowing to the battery 56. Since the summing point 106 is connected to the junction 114 of the voltage divider composed of the resistors 110, 112, the particular voltage appearing at the summing point 106 is an algebraic sum of the voltage supplied by the current sensing circuit 88 and the voltage supplied by the voltage divider 110, 112. It should be noted that the voltage at the summing point 106 cannot be less than the voltage at the junction 114 because of the action of the diode 104.

It is the current supplied by the transistor 90 and the current supplied through the resistor 108 that is responsible for charging the capacitor 116, doing so, of course, via the summing point 106. More specifically, when the capacitor 116 is charged to about, say, several millivolts more than three volts, and with a reference voltage of, say, three volts, then it follows that the few millivolt difference applied to the inputs of the error amplifier 120 via the leads 4, 5 of the regulator 118 will cause the output voltage supplied from the lead 10 to assume a value representative of the difference between the amplifier's inputs. More specifically, the regulator 118, under the several millivolt error as described above, will cause the transistor 146 to conduct only slightly, thereby delaying the trigger pulses to SCR 40 and SCR 42 and concomitantly causing these SCRs to conduct relatively late in each half cycle, as should be evident from the shaded portions of the waveform 176 in FIG. 4. Conversely, with a reference voltage of, say, three volts and a voltage of a few millivolts across the capacitor 116 less than the reference voltage, the regulator 118 will cause the transistor 146 to conduct heavily, thereby causing triggering of the SCRs 40, 42 earlier in each half cycle, as illustrated by the waveform 175 of FIG. 3, which, of course, results in an increased current flow through the battery 56. It will be recognized that the change in current flow to the battery 56 caused by the regulator 118 is in a direction to cause the absolute voltage difference between the leads 4, 5 of the regulator 118 to decrease. Since the transistor 146 is a PNP transistor, the flow of current through resistor 142 (and resistor 144) will cause the emitter to become more positive with respect to the conductor 86 (ground) than the base of the transistor 146; stated somewhat differently, the base becomes more negative with respect to the emitter and to produce a conduction of the transistor 146 in accordance with the output voltage signal, the amount of conduction determining the charging rate for the capacitor 158 and hence the triggering speed or rate of the device 148.

It should be understood that as the charging of the battery 56 proceeds, the voltage between the output or load terminals 54 and 55 will increase, the increase reflected at the junction 114 of the voltage divider 110, 112 causing the summed voltage at the point 106 to be maintained at the reference voltage applied to lead 5 of the regulator 118 to an increasing degree by the voltage of junction 114, and to a decreasing degree by the current through diode 104. It will be appreciated that during normal operation of the charging system the voltage difference between the leads 4, 5 of the regulator 118 is always within a few millivolts of zero due to the aforesaid regulating action of the regulator 118. Thus, the transition from a current mode control to a voltage mode control, as would be the case for an increasing voltage across the output terminals 54 and 55, is accomplished by maintaining the voltage across the capacitor 116 with a current through resistor 108 rather than by means of a current through the diode 104. When the voltage at the summing point 106 equals the reference voltage supplied by the potentiometer 132, then there is a zero difference applied to the input leads 4, 5 of the regulator 118 causing an output or control voltage having a value representative of this zero difference to appear on the lead 10.

Consequently, when a charging period is initiated, for example, with a nominally discharged battery 56 and with an input voltage (see waveform 174 in FIG. 2) to the primary winding 22 of the transformer 21 at the low end of the specified 95–135 volt range (or the low end of a 190–270 volt range, as the case may be), there will be a relatively large output voltage on the lead 10 of the regulator 118, as the regulator 118, under these operating conditions, compensates for the relatively low input voltage and the relatively high current demand of the battery 56. This larger output signal via lead 10 of the regulator 118 causes the transistor 146 to conduct heavily with the consequence that the capacitor 158 is rapidly charged. As soon as the capacitor 158 is charged to the proper triggering voltage (on the order of eight volts), the device 148 conducts so as to forward a gating signal to the SCR 40 during one-half of the cycle and to SCR 42 during the other half. In other words, as the input voltage 174 (FIG. 2) supplied to the transformer 21 goes positive, there will be a turning on of the SCR 40 earlier in the positive going half of the cycle, the same thing holding true for the SCR 42 on the negative part of the cycle. The waveform 175 pictured in FIG. 3 is intended to visually portray what happens, the shaded areas indicating a greater current flow. Thus, a phase control starts earlier when the triggering device 148 acts during the early portion of the cycle, which it does when the transistor 146 is conducting more heavily than when its state of conduction is reduced. Resistor 160 supplies a discharge path from the capacitor 158 to the conductor 86 (ground), the discharge path also including the base of the transistor 146 which base is connected directly to the conductor 86. Thus, the capacitor 158 does not retain its charge but continually charges and discharges, the rate changing in accordance with the amount of conduction of the transistor 146. It will be understood that the capacitor 158 is always discharged to the same voltage level at the end of each half-cycle by forward conduction through the collector-base path within the transistor 146, thereby providing the necessary triggering stability.

In actual practice, when the battery voltage is less than 28.8 volts, then the current sensing circuit 88 causes the battery charger 20 to operate in its current-controlled mode. As the voltage increases due to the battery 56 becoming more fully charged, the 28.8 volts threshold value is reached which causes the circuit to change into its voltage-controlled mode, thus causing only a small amount or trickle current to be supplied via the output terminals 54, 55 to the battery 56.

Figure 5:
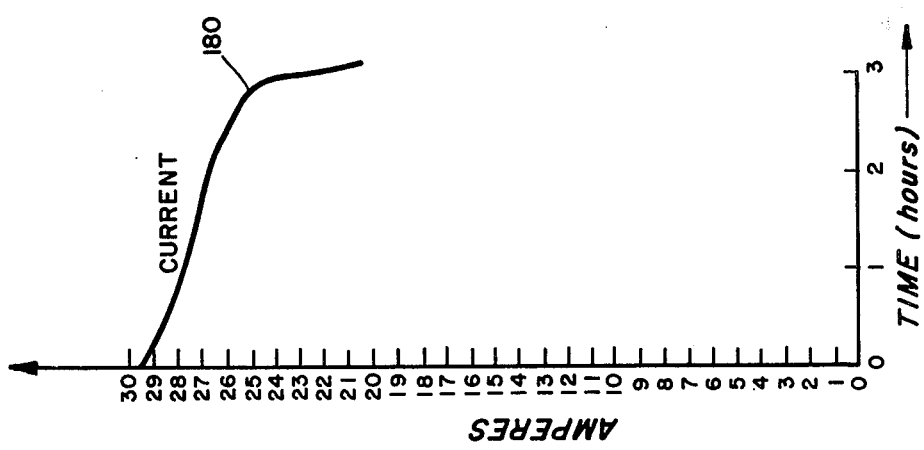
FIG. 5 is a discharge profile of a typical battery, the discharge current being plotted against time.

It may be helpful to refer to FIGS. 5 and 6 at this time which show discharging and charging profiles, respectively, for a given battery. In FIG. 5 the current curve has been assigned the reference numeral 180, the ordinate representing amperes and the abscissa hours. In FIG. 6 both voltage and current curves 182 and 184 have been plotted against time, the ordinate at the left representing amperes and the ordinate at the left volts. When the battery voltage reaches 28.8 volts, then, as can be discerned from FIG. 6, there is a relatively rapid decrease in the amount of current, the decreased current then continuing indefinitely without battery damage until the battery 56 is disconnected from the terminals 54, 55.

It will be recalled that it was earlier stated that the potentiometer 94 is in parallel with the current sensing resistor 70. More specifically, the potentiometer 94 and the collector-emitter circuit of the transistor 143 are connected in parallel with the current sensing resistor 70. Obviously, the transistor 143 must be conducting in order for the current sensing circuit 88 to exercise its control function. To achieve this, the transistor 143 is normally saturated whenever the circuit is operating. Not only is there then a flow of current through the potentiometer 94 and the collector-emitter circuit of the transistor 143, but there is also a flow of current through its emitter and base, through the resistor 166, the diode 168 to the fuse 36, if that end of the transformer winding 28 is negative with respect to its center tap 34, but through the diode 170 to the fuse 38 if the other end of the transformer winding 28 is negative with respect to the center tap 34. The capacitor 172 will have a zero charge that causes the base current to flow as just explained.

However, when the terminals 24 and 26 are disconnected from the AC power source, which has not been shown, then there is, of course, no power supplied to the circuit from the transformer 21 and therefore, quite obviously, no current flows through the diodes 168, 170. This shuts off the transistor 143. When current is flowing through the transistor 90, though, as it does during the charging of the battery 56, this causes a charge to be placed on the capacitor 116 which is utilized in the normal operation of the circuitry comprising the charger 20, the charge on the capacitor 116 applying a voltage obtained from the summing point 106 to the input lead 4 of the regulator 118. The charge on the capacitor 116 is increased when the power is disconnected because the transistor 143 ceases to conduct, causing capacitor 98 to retain (or increase) its charge, which, in turn, causes transistor 90 to conduct. In this regard, it will be observed that the emitter of transistor 90 is connected to the positive side of the battery 56 through resistors 100, 70, conductor 80 and output terminal 54; the collector of this transistor is connected to the negative side of the battery 56 through resistor 102, diode 104, resistors 108, 112 and output terminal 55. And, as in normal operation, the conduction of transistor 90 causes capacitor 116 to retain (or increase) its charge with capacitor 116 applying, say, a five volt potential to lead 4 of regulator 118, and with lead 5 of the regulator 118 having a three volt potential applied thereto, then the output of regulator 118 at lead 10 will have nearly zero potential, resulting in no conduction of transistor 146. With the transistor 146 non-conductive, then the triggering device 148 does not fire, for there is no voltage delivered to the timing capacitor 158 and it must be charged to the necessary degree before the triggering device conducts.

After turning the power back on, then the transistor 143 again saturates which turns off transistor 90, the capacitor 98 then discharging. This stops the flow of current that was previously holding capacitor 116 at a potential greater than that of lead 5 of the regulator 118, but not instantaneously. Until this occurs, though, the capacitor 116 discharges slowly through resistor 108 and resistor 112. As soon as the charge remaining on the capacitor 116 results in a voltage equal to the reference voltage supplied by the potentiometer 132, then there will be an increasing output voltage on the lead 10 of the regulator 118, and the transistor 146 conducts by reason of the voltage supplied by the output lead 10.

The above results in the timing capacitor 158 becoming charged and when sufficiently charged, then the triggering device 148 is caused to conduct with the consequence that the firing action for the silicon controlled rectifiers 40 and 42 is resumed. This does not re-occur instantaneously, though, for there are several cycles in which the firing of the rectifiers 40, 42 is later in the cycle. Stated somewhat differently, the firing is delayed until toward the end of each half cycle (see waveform 176 in FIG. 4) and this delay is steadily decreased by virtue of the progressively more rapid charging of the timing capacitor 158 until the triggering action provided by the device 148 takes place quite early in each cycle (see waveform 175 in FIG. 3) which would supply the full amount of charging current to the battery 56. This slow "turn on" (even though only for a few cycles) is quite advantageous, because the fuses 36 and 38 are prevented from unnecessarily blowing.

I claim:

1. A battery charger for connection to a source of AC power comprising:
    rectifier means for supplying charging current to a battery;
    a magnetically decoupled transformer having a primary coil connected to the source of AC power, a secondary coil connected to said rectifier means, and a magnetic shunt path for a portion of the magnetic flux generated by said primary coil for limiting said charging current to a predetermined maximum value;

a resistor in series with said rectifier means and having a voltage drop thereacross generated by the flow of charging current therethrough;

circuit means responsive to said voltage drop for providing a first voltage signal representative of the amount of charging current being supplied to the battery by said rectifier means;

a voltage divider in parallel with the battery, said voltage divider providing a second voltage signal representative of the battery voltage;

means for controlling said rectifier means in accordance with said first and said second voltage signals to increase the flow of charging current when the battery voltage is below a threshold value and to decrease the flow of charging current when the battery voltage reaches said threshold value, said controlling means further comprising:

means for providing a summing point for algebraically summing said first and said second voltage signals that are representative of the amount of charging current and battery voltage, respectively.

2. A battery charger in accordance with claim 1 wherein said means for controlling said rectifier means further comprises:

an error amplifier having a pair of inputs and an output, one of said inputs being connected to said summing point and the other of said inputs being connected to a reference voltage, and the resulting signal provided at said output, which is representative of the difference between the voltages applied to said inputs, controlling said rectifier means.

3. A battery charger in accordance with claim 2 wherein said means for controlling said rectifier means further comprises:

a first potentiometer for furnishing said reference voltage signal, said potentiometer having an adjustable contact connected to said other of said inputs of said error amplifier so as to vary said threshold voltage.

4. A battery charger in accordance with claim 3 wherein said first means providing a signal representative of the amount of charging current being supplied to said battery by said rectifier means further comprises a first transistor and a second potentiometer for changing the bias applied to said transistor, said second potentiometer having an adjustable contact connected to the base of said first transistor so as to vary the degree of conduction of said first transistor in relation to the voltage drop across said resistor and hence the voltage constituting said signal representative of charging current so as to vary said charging current.

5. A battery charger in accordance with claim 4 further comprising:

means for delaying the controlling of said rectifier means when the charger is initially connected to a source of AC power.

6. A battery charger in accordance with claim 5 wherein said delaying means initially changes the voltage applied to said one input of said error amplifier in a direction to cause the resulting signal at the output of said error amplifier to control said rectifier means so as to reduce the charging current.

7. A battery charger in accordance with claim 6 wherein said delaying means further comprises:

a second transistor for increasing the conduction of said first transistor to temporarily increase the voltage normally representative of the amount of said charging current so that said summing point applies a voltage to said one input of said error amplifier sufficiently greater than said reference voltage so as to reduce the resulting signal at said output of said error amplifier to zero.

* * * * *